March 25, 1941.  G. RANDL  2,236,114
WIND RECORDING DEVICE
Filed Sept. 23, 1939  3 Sheets-Sheet 2
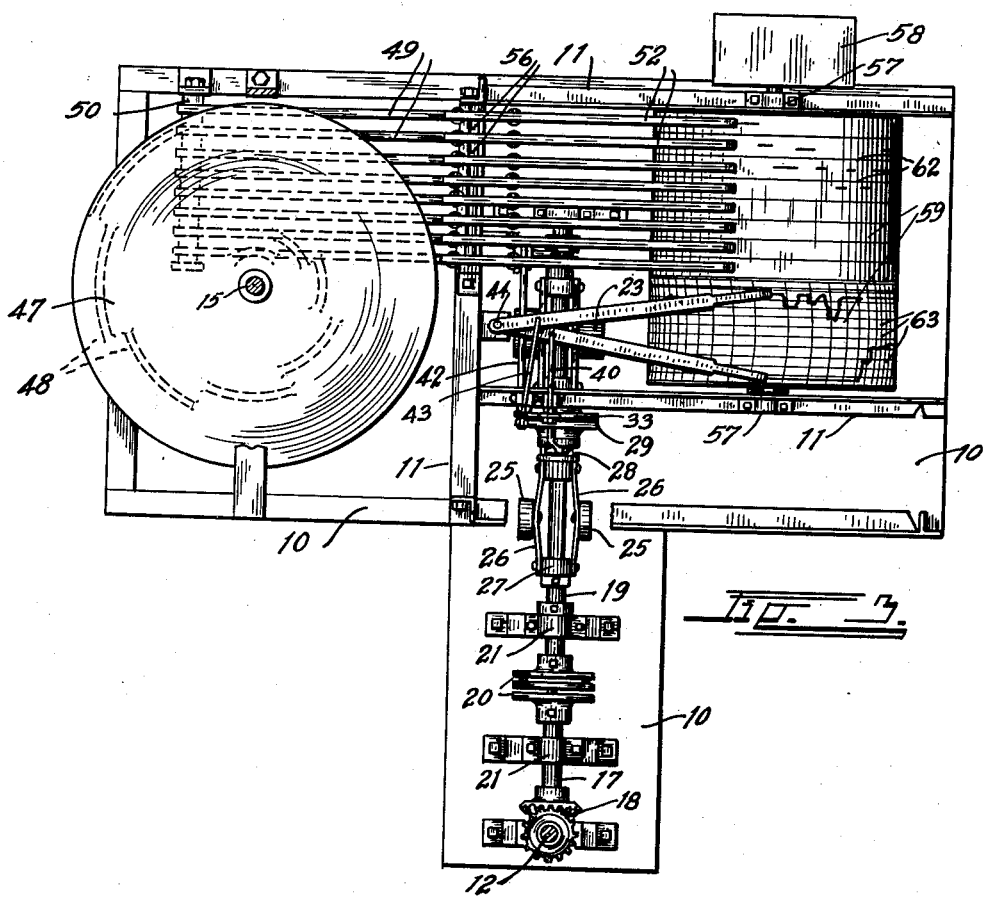
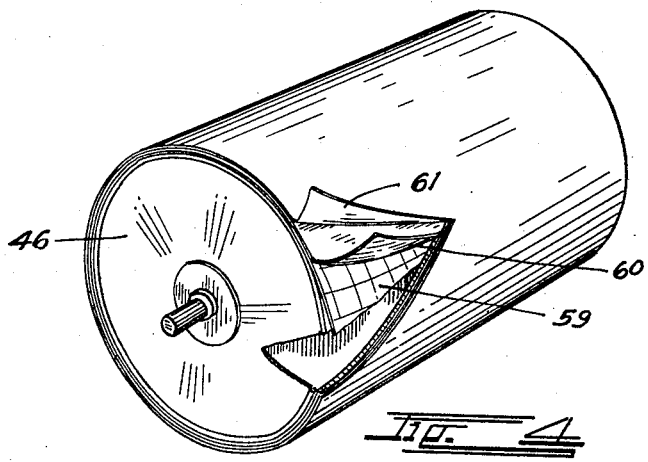
INVENTOR
GEORGE RANDL
BY
ATTORNEY

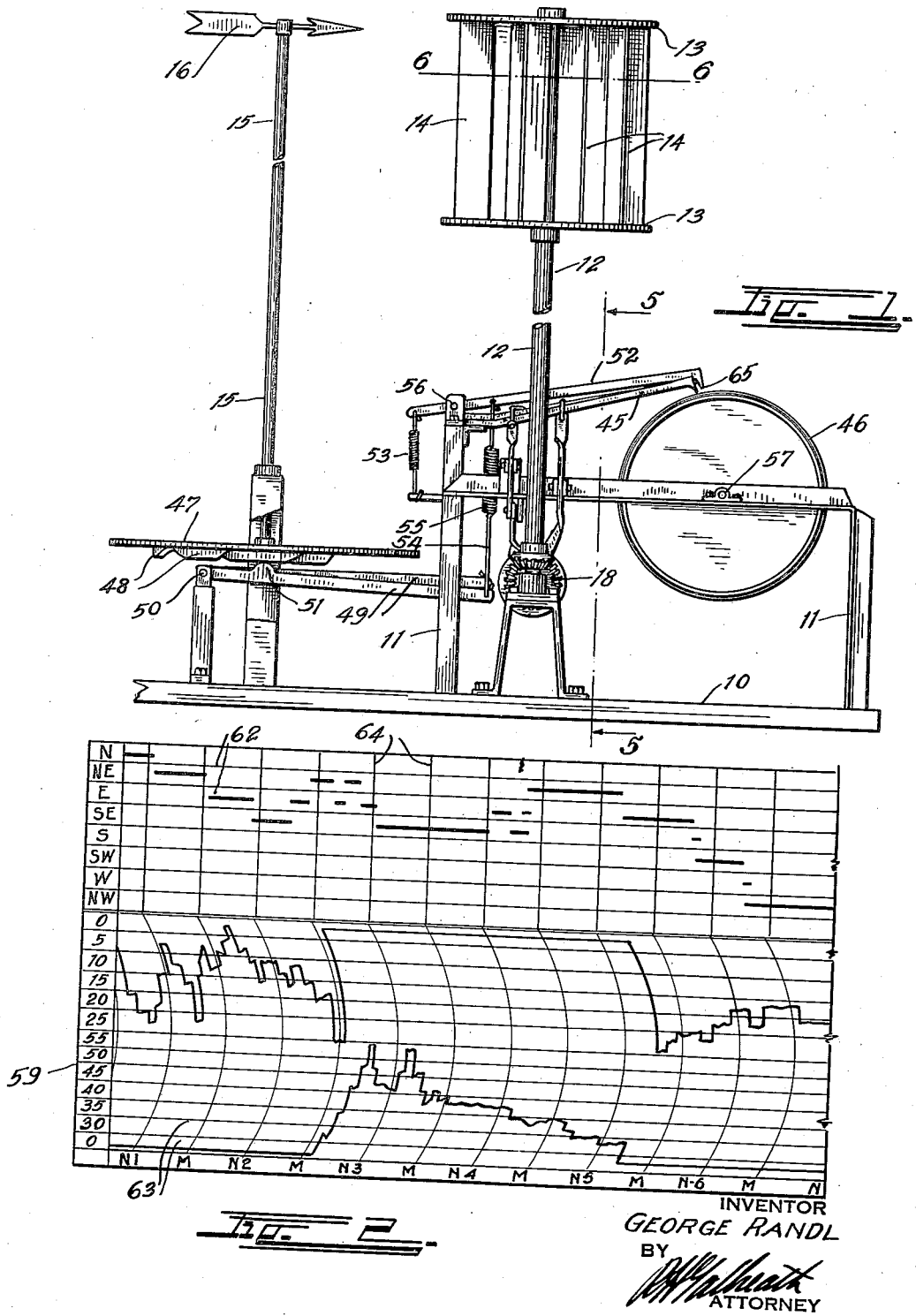

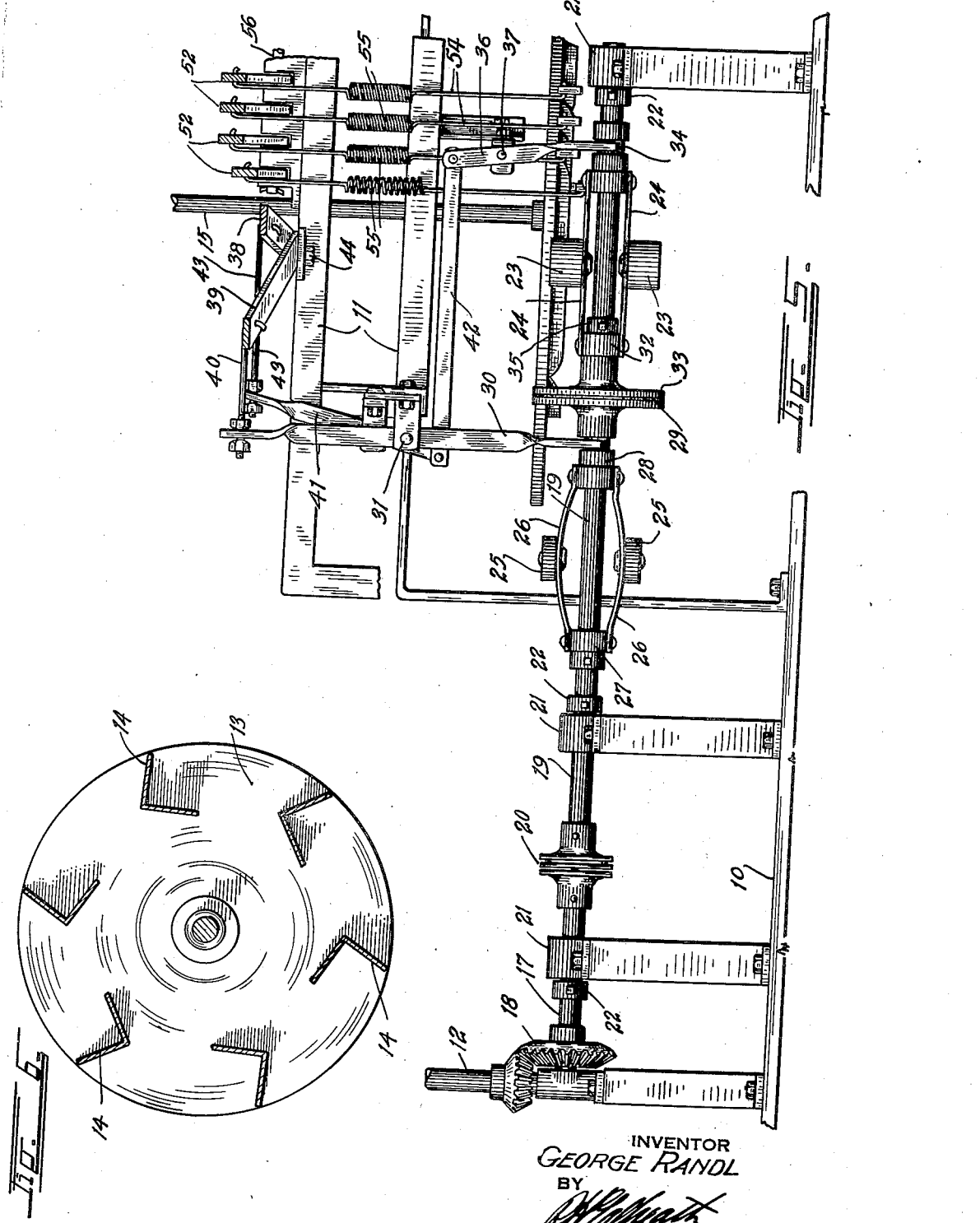

Patented Mar. 25, 1941

2,236,114

UNITED STATES PATENT OFFICE 2,236,114

WIND RECORDING DEVICE

George Randl, Idaho Springs, Colo.

Application September 23, 1939, Serial No. 296,232

4 Claims. (Cl. 73—188)

This invention relates to a combination recording anemometer and wind direction recorder and has for its principal object the provision of a simple, efficient, and accurate device which will delineate a continuous and constant record of both the speed and direction of the wind at all hours of the day.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of the improved wind speed and direction recording device.

Fig. 2 illustrates a typical record sheet as produced by the recording mechanism.

Fig. 3 is a plan view of the complete recording mechanism.

Fig. 4 is a fragmentary detail view illustrating the record drum and its recording sheets.

Fig. 5 is an enlarged cross section through the complete device taken on the line 5—5, Fig. 1.

Fig. 6 is an enlarged horizontal section through the wind responsive member portion of the device taken on the line 6—6, Fig. 1.

The improved wind recording device is mounted as a unit upon a suitable base 10 from which a supporting frame structure 11 arises. The rotative effort for driving the velocity recording mechanism is transmitted to the device from a vertical anemometer shaft 12 extending upwardly through the roof of the building or enclosure in which the mechanism is housed. The upper extremity of the shaft 12 terminates in a wind responsive member consisting of two wheel-like members 13 between the peripheries of which vertical V-shaped air pockets 14 extend. The pockets are so positioned on the wheel-like members that their open sides at one side face the wind regardless of the direction from whence it comes so that the shaft 12 will be rotated whenever there is a wind movement.

The rotative effort to operate the wind direction recording mechanism is obtained from a vane shaft 15 extending upwardly sufficiently far to place a wind vane 16 in the wind flow. The wind vane is fixedly secured on the upper extremity of the shaft 15. It is preferred to place the wind vane at a higher elevation than the wind responsive member to prevent interference therefrom.

The wind responsive member shaft 12 drives a horizontal shaft 17 through the medium of suitable miter gears 18. The horizontal shaft 17 is joined to a governor shaft 19 through the medium of a suitable, flexible coupling 20 which prevents vibration in the horizontal shaft from affecting the accuracy of the governor shaft.

The governor shaft 19 is horizontally journalled in the frame 11 in suitable bearings 21 and is prevented from axial movement therein by means of suitable set collars 22. The governor shaft carries two governor mechanisms, one consisting of a plurality of heavy weights 23 mounted on flexible leaf springs 24 and the other consisting of a plurality of relatively light weights 25 mounted on leaf springs 26.

One extremity of each of the springs 26 is secured to a governor fitting 27 fixedly attached to the shaft 19 by means of set screws or other devices. The other extremity of each of the springs 26 is secured to a hub 28 carrying a clutch face plate 29. The hub 28 is grooved to receive the forked lower extremity of a yoke lever 30 which is pivoted at 31 on one of the frame members 11.

One extremity of each of the heavy weight springs 24 is secured to a second hub 32 on a second clutch face plate 33. The hub 28 rotates with the shaft 19 but is free to move axially thereon under the pull of the weights 25. The hub member 32 and the face plate 33 are free to rotate on the shaft 19 but are prevented from moving axially thereon by a set collar 35. The other extremities of the springs 24 are fixed to a governor fitting 34 which is free to move axially of and to rotate upon the shaft 19 under the influence of the weights 23. The springs 26 are normally flexed to hold the clutch plate 29 against the clutch plate 33 to rotate the latter with the shaft. The fitting 34 is grooved to receive the forked lower extremity of a second yoke lever 36 which is pivoted to one of the frame members 11 and 37.

The governor weights 25 control a high velocity recording arm 39 and the governor weights 23 control a low velocity recording arm 38. The yoke lever 30 is connected to its arm 39 by means of a suitable connecting rod 40. The yoke lever 36 is connected to the arm 38 through a reverse motion lever 41 by means of suitable connecting rods 42 and 43.

The recording arms 38 and 39 are mounted on a common pivot pin 44, on a member of the frame 11, at their other extremity to form marking points 45 which rest on a record drum 46 to be later described.

The vane shaft 15 is connected directly to a horizontal cam disc 47 on the lower face of which a spiral series of cam bosses 48 are arranged. Each cam boss is positioned at a different radial distance from the disc axis and on a different radial line from the others. The cam bosses correspond in number to the different compass directions for which an indication is desired. Any desired number of bosses may be employed. In the embodiment illustrated there are eight bosses, one for each cardinal direction (N, E, S, W) and one for each intermediate quadrant (NE, SE, SW, NW).

A series of cam levers 49 are hinged on a lever shaft 50 beneath the disc 47. Each cam lever is provided with a projecting cam 51 and all of the latter are aligned on a radius of the disc 47 in alignment with the paths of the cam bosses 48.

Each of the cam levers is connected to an individual direction indicating arm 52, all of which are pivoted on a common rocker shaft 56, by means of a connecting rod or wire 54 and a tension spring 55 so that downward movement of the levers will pull the arms downwardly. The arms are constantly urged upward by means of lift springs 53 acting on the opposite side of the rocker shaft 56. The latter springs also serve to hold the cam levers 49 against the bottom of the cam disc. The tension springs 55 are relatively stiffer than the lift springs 53 so that they can operate against the latter. The extremities of the arms 52 are turned downward to form marking points 65.

The recording drum 46 preferably consists of a hollow metallic drum mounted to rotate in suitable bearings 57 and driven by a uniform slow-speed mechanism such as a spring actuated-clock motor 58. A record sheet 59, such as shown in detail in Fig. 6, is first wrapped about the drum. A sheet of carbon paper 60 is then wrapped over the record sheet. A third protective paper sheet 61 may be placed about the carbon paper, although this is not essential.

The record sheet is printed or lithographed with a series of eight, peripheral wind direction columns 62 headed with the compass directions N, NE, E, etc. It also contains a peripheral series of miles-per-hour columns 63. The sheet is divided into time intervals by means of a series of laterally extending time division lines 64.

*Operation*

Let us assume that the record sheets are in place on the drum 46 and the latter is rotating under the influence of the clock motor 58. Should a five-mile per hour breeze spring up from the north, the wind responsive member will rotate and the vane 16 will swing to the "North" position. The movement of the vane will bring the "North" cam boss over its lever 49 causing the latter to pull its recording arm 52 downwardly so that its marking point will contact the sheets on the drum to offset a line in the "North" column on the record sheet. This line will continue until the wind direction veers from the north position.

Simultaneously the wind responsive member will rotate the governor shaft 19 and the governor weights thereon. The relatively slow speed of the wind will not be sufficient to expand the light weights 25 but will be sufficient to expand the heavy weights 23. The latter in separating will pull the fitting 34 inward and swing the low velocity lever 38 from its "0" column to the "5 miles per hour column" causing a carbon record curve to be made on the record sheet.

The low velocity lever will continue to record all changes until a velocity of, say, 25 miles per hour is reached. The centrifugal action of the light weights is now sufficient to cause them to expand the springs 26 and pull the clutch face 29 from the clutch face 33. This allows the heavy weights to cease rotating, since they are driven only by the clutch faces, and causes the lever 30 to transmit movement to the high velocity arm 39. The low velocity arm 38 now moves to its "0" column and the arm 39 begins to delineate a curve in the higher velocity columns as indicated in Fig. 2. Any changes in wind direction during this time will be recorded as straight lines in the respective wind direction columns.

By having a separate governor for the low and high velocity winds, respectively, a much greater accuracy can be obtained and winds of exceedingly low velocity can be recorded.

It can be readily seen that the operator can ascertain instantly from the record sheet for any minute of the recorded time the exact speed and direction of the wind at that particular time. This accuracy in both speed and direction make it possible to plot accurate weather charts for the prediction of the weather conditions of areas in which these devices are placed.

The machine is especially useful for isolated unattended stations where electricity is not available and where it must operate for long periods without attention. The carbon paper makes the device independent of uncertain ink or pencil supplies and requires no attention after the sheets are in place. In the present machines the drums are set to revolve once in eight days.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A wind recorder comprising: a wind vane; a disc rotated by said vane; a plurality of cam members on said disc, there being one cam member for each wind direction; a series of cam follower arms adjacent said disc, each of said arms being in the path of one of said cam members; a traveling recording chart; and marking arms positioned in marking relation to said chart, each marking arm being operatively connected to one of the said follower arms so that when the latter is actuated, it will bring its marking arm into contact with the chart.

2. A wind direction recorder comprising: a vertical vane shaft; a weather vane on said shaft for rotating the latter in accordance with changes in wind direction; a cam disc mounted on said vane shaft; a spiral series of cams on said cam member, each positioned a different radial distance from the axis of said shaft and on a different radial line from the other cams, said cams corresponding in number to the number of different wind directions desired to be recorded; a series of cam levers hinged adjacent said disc, there being one cam lever overlying the path of each of said cams so as to be actuated by the latter; and recording means actuated by the movements of said levers to record the intervals that each lever is in contact with its cam.

3. A wind direction recorder comprising: a vertical vane shaft; a weather vane on said shaft for rotating the latter in accordance with changes in wind direction; a cam disc mounted on said vane shaft; a spiral series of cams on said cam disc, each positioned a different radial distance from the axis of said shaft and on a different radial line from the other cams, said cams corresponding in number to the number of different directions desired to be recorded; a series of cam levers hinged adjacent said disc, there being one cam lever overlying the path of each of said cams so as to be actuated by the latter; spring means for urging said levers against said cam disc and said cams; a traveling record chart; recording levers over said chart, there being one recording lever for each cam lever; and means for transmitting the movements of said cam levers to said recording levers to cause the latter to record on said chart the intervals that each cam lever is in contact with its cam.

4. A wind direction recorder comprising: a vertical vane shaft; a weather vane on said shaft for rotating the latter in accordance with changes in wind direction; a cam disc mounted on said vane shaft; a spiral series of cams on said cam disc, each positioned a different radial distance from the axis of said shaft and on a different radial line from the other cams, said cams corresponding in number to the number of different wind directions desired to be recorded, said disc being horizontal, said cams being on the under face thereof; a series of cam levers hinged on a horizontal axis below said disc and lying tangentially thereof, there being one of said cam levers in the path of each cam so as to be contacted and actuated thereby; a rotating recording chart; a series of recording levers having their extremities over said chart; and means for transmitting the cam-actuated, downward movements of said cam levers to said recording arms to bring the latter into recording relation with said chart.

GEORGE RANDL.